United States Patent [19]

Johnson

[11] 4,451,574

[45] May 29, 1984

[54] POLYMERIZATION CATALYST

[75] Inventor: Burnett H. Johnson, Baytown, Tex.

[73] Assignee: Exxon Research & Engineering Co., Florham Park, N.J.

[21] Appl. No.: 461,602

[22] Filed: Jan. 31, 1983

Related U.S. Application Data

[63] Continuation-in-part of Ser. No. 307,134, Sep. 30, 1981, abandoned.

[51] Int. Cl.$^3$ ............................................. C08F 4/64
[52] U.S. Cl. .................................. 502/115; 502/114; 502/119; 526/129; 526/137
[58] Field of Search ..................... 252/429 B; 502/114, 502/115, 119

[56] References Cited

U.S. PATENT DOCUMENTS

| | | | |
|---|---|---|---|
| 3,094,568 | 6/1963 | Hay et al. ................... | 252/429 B X |
| 4,004,071 | 1/1977 | Aishima et al. ............ | 252/429 C X |
| 4,173,547 | 11/1979 | Graff .............................. | 252/429 B |
| 4,263,171 | 4/1981 | Shida et al. ................. | 252/429 B X |
| 4,276,191 | 6/1981 | Karayannis et al. ........... | 252/429 C |
| 4,367,322 | 1/1983 | Shiga et al. ................. | 252/429 B X |

FOREIGN PATENT DOCUMENTS 32308   7/1981   European Pat. Off. .

*Primary Examiner*—Patrick Garvin
*Attorney, Agent, or Firm*—M. B. Kurtzman

[57] ABSTRACT

Ethylene is homopolymerized or copolymerized with another olefin monomer in the presence of a catalyst system comprising organo metal cocatalyst and a titanium-containing catalyst component, such titanium-containing catalyst component being obtained by reacting together a porous particulate material, an organo magnesium compound, a halogen or interhalogen compound and titanium tetrachloride.

22 Claims, No Drawings

POLYMERIZATION CATALYST

This application is a continuation in part of application Ser. No. 307,134, filed Sept. 30, 1981 and now abandoned.

BACKGROUND OF THE INVENTION

This invention relates to a novel catalyst component to be employed with a co-catalyst for producing polyolefins such as polyethylene, polypropylene and the like or copolymers such as ethylene copolymers with other alpha-olefins and diolefins, which catalyst component shows unusually high activity and excellent hydrogen response for the control of polymer molecular weight. The catalyst component comprises a solid reaction product obtained by contacting in stages a transition metal compound, an organometallic composition and a halogen or interhalogen compound either in the presence or absence of a solid, particulate, porous support material such as, for example, silica, alumina, or silica-alumina. The novel catalyst component which when used in combination with the co-catalyst, provides the novel catalyst system of this invention.

The catalyst systems can be usefully employed in slurry, single phase melt, solution and gas phase polymerization processes and is particularly effective for the production of linear polyethylenes such as high-density polyethylene and linear low density polyethylene.

Recently, interest has arisen in the use of magnesium-titanium complex catalyst components for the polymerization of olefins. These magnesium-titanium complex catalyst components have been prepared in the presence of support material such as silica or in the absence of support material. For example, European Patent Application No. 27733, published Apr. 29, 1981 discloses a catalyst component obtained by reducing a transition metal compound with an excess of organomagnesium compound in the presence of a support such as silica and thereafter deactivating the excess organomagnesium compound with certain deactivators including hydrogen chloride. U.S. Pat. No. 4,136,058 discloses a catalyst component comprising an organomagnesium compound and a transition metal halide compound, which catalyst component is thereafter deactivated with a deactivating agent such as hydrogen chloride. This patent does not teach the use of support material such as silica but otherwise the disclosure is similar to the above-discussed European patent application.

U.S. Pat. No. 4,250,288 discloses a catalyst which is the reaction product of a transition metal compound an organomagnesium component and an active non-metallic halide such as HCl and organic halides containing a labile halogen. The catalyst reaction product also contains some aluminum alkyls.

Catalyst components comprising the reaction product of an aluminum alkyl-magnesium alkyl complex plus titanium halide are disclosed in U.S. Pat. Nos. 4,004,071 and 4,276,191.

U.S. Pat. Nos. 4,173,547 and 4,263,171, respectively disclose a catalyst component comprising silica, an aluminum-type titanium tetrachloride and dibutyl magnesium and a catalyst component comprising a magnesium alkyl-aluminum alkyl complex plus titanium halide on a silica support.

The use of chlorine gas in polymerization processes are taught in U.S. Pat. No. 4,267,292 wherein it is disclosed that chlorine gas is to be added to the polymerization reactor after polymerization has been initiated in the presence of a Ziegler catalyst. U.S. Pat. No. 4,248,735 teaches subjecting a silica support to a treatment with bromine or iodine and thereafter incorporating a chromium compound onto the support. U.S. Pat. No. 3,513,150 discloses the treatment of gamma alumina plus titanium tetrachloride with a gaseous chlorinating agent and employing said treated material in combination with a co-catalyst for the polymerization of ethylene.

European patent application No. 32,308 discloses polymerizing ethylene in the presence of a catalyst system comprising an organic metal compound and a titanium-containing material which is obtained by reacting together an inert particulate material, an organic magnesium compound, a titanium compound and a halogen containing compound such as $SiCl_4$, $PCl_3$, $BCl_3$, $Cl_2$ and the like. The criticality of halogen and interhalogen and their availability at the last stage of catalyst preparation is not disclosed.

The catalyst systems comprising magnesium alkyls and titanium compounds, although useful for the polymerization of olefins such as ethylene and other 1-olefins, do not show excellent responsiveness to hydrogen during the polymerization reaction for the control of molecular weight and do not show an extremely high catalytic activity.

In accordance with this invention catalyst combinations have been found which have extremely high catalytic activities and excellent hydrogen responsiveness for the control of molecular weight. The new catalysts and catalyst component of this invention are obtained by contacting an organometallic compound, a transition metal compound and a halogen or interhalogen compound in the presence or absence of a oxide support. The catalyst system employing the catalyst component is advantageously employed in a gas phase ethylene polymerization process since there is a significant decrease in reactor fouling as generally compared with catalytic prior art ethylene gas phase polymerization processes thereby resulting in less frequent reactor shut downs for cleaning purposes.

SUMMARY OF THE INVENTION

In accordance with the objectives of this invention there is provided a catalyst component for the polymerization of alpha-olefins comprising a solid reaction product obtained by contacting in an inert solvent a solid oxide support of a Group IIA, IIIA, IVA and IVB metal or a finely divided polyolefin in separate stages with (A) at least one organometallic compound of a Group IIA, IIB and IIIA metal, (B) at least one transition metal compound of a Group IVB, VB, VIB, VIIB and VIII metal, and at any stage of the contacting, (C) a sufficient amount of a halogen or interhalogen compound such that after said solid oxide is contacted with said organometallic compound and said transition metal compound, halogen or interhalogen compound is available, i.e. present at the last stage.

The catalyst component when employed in combination with a co-catalyst such as an alkyl aluminum co-catalyst provides a catalyst system which demonstrates a number of unique properties that are of great importance in the olefin polymerization technology such as, for example, extremely high catalytic activity, the ability to control the molecular weight during the polymerization reaction as a result of the improved responsiveness to hydrogen, increased polymer yield, and reduced reactor fouling.

In accordance with this invention, there is also provided a catalyst component for the polymerization of alpha-olefins comprising the solid reaction product obtained by contacting in an inert solvent an organometallic compound of a Group IIA, IIB and IIIA metal, a transition metal compound of a Group IVB, VB, VIB, VIIB and VIII metal and halogen or interhalogen compound, i.e. a catalyst component absent the solid oxide support.

The catalyst components of this invention are particularly useful for the polymerization of alpha-monoolefins which comprise the solid reaction product obtained by contacting in an inert solvent a solid oxide support of a Group IIA, IIIA, IVA and IVB metal or finely divided polyolefin in separate stages with (A) at least one organometallic composition represented by the formula $Me_x^{II} Me_y^{III} R_z X_{2x+3y-z}$ wherein $Me^{II}$ is a Group IIA or IIB metal (Mendeleev's Periodic Table of Elements as shown in The Chemical Rubber Company's Handbook of Chemistry and Physics, 48th Edition) or mixtures thereof and $Me^{III}$ is a Group IIIA metal or mixtures thereof, R represents one or more hydrocarbyl or substituted hydrocarbyl group which can be the same or different, each having from 1 to 20 carbon atoms, X is a halogen or alkoxide or mixtures thereof, the ratio of $y/x+y$ is from 0 to 1, $0<x+y$, z has a value within the range of 1 to $2x+3y$, (B) a transition metal compound or combination of transition metal compounds represented by the formula $TrX'_{4-q}(OR')_q$, $TrX'_{4-q}R''_q$, $VO(OR')_3$ and $VOX'_3$ wherein Tr is a transition metal of Groups IVB, VB, VIB, VIIB and VIII and preferably titanium, R' is an aryl group, aralkyl group, substituted aralkyl group having from 1 to 20 carbon atoms and 1,3-cyclopentadienyls, X' is halogen and q is zero or a number less than or equal to 4, and at any stage of the contacting; (C) a halogen or interhalogen compound subject to the proviso that after said solid oxide is contacted with said organometallic compound and said transition metal component, halogen or interhalogen compound is available and recovering the halogen or interhalogen treated reaction product.

Although, in accordance with this invention, the order of addition of the ingredients can vary, the catalyst component is preferably prepared by either (A) first reacting the organometallic compound and the transition metal compound in the presence of a support material of a Group IIA, IIIA, IVA and IVB metal oxide, or a finely divided polyolefin or other suitable support material and thereafter subjecting the system to treatment with halogen or interhalogen compound, or (B) subjecting the support material to treatment with halogen or interhalogen compound, and thereafter adding the organometallic compound followed by the transition metal compound. With respect to method (B) it is desirable to purge the halogen or interhalogen from the solvent prior to metal compound additive. Preferably, the support material is one of silica, alumina or silica-alumina.

In the preparation of the unsupported catalyst component according to this invention the order of addition of the organometallic compound and the transition metal compound to the inert solvent can also be varied, for example, the transition metal compound and the organometallic composition can be contacted in an inert solvent simultaneously and thereafter treated with the halogen or interhalogen compound, the transition metal compound and the organometallic composition can be added sequentially in any order and thereafter treated with the halogen or interhalogen compound.

In other aspects of this invention there is provided a catalyst system comprising the catalyst component and an organoaluminum co-catalyst and a process for the polymerization of alpha-olefins using the catalyst of this invention under conditions characteristic of Ziegler polymerization.

A further aspect of this invention is the process of increasing catalytic activity of the reaction product of the transition metal and organometallic compound in the presence or absence of the support by treatment of such reaction product prior to its use in a polymerization reactor with a halogen or interhalogen compound. Another aspect of this invention is a polymerization process which obtains significantly reduced gas phase reactor fouling.

In view of the high activity of the catalyst system prepared in accordance with this invention as compared with conventional Ziegler catalysts, it is generally unnecessary to deash polymer product since polymer product will generally contain lower amounts of catalyst residues than polymer product produced in the presence of conventional catalyst.

The catalyst systems can be employed in a gas phase process, single phase melt process, solvent process or slurry process. The catalyst system is usefully employed in the polymerization of ethylene and other alpha-olefins, particularly alpha-olefins having from 3 to 8 carbon atoms and copolymerization of these with other 1-olefins or diolefins having from 2 to 20 carbon atoms, such as propylene, butene, pentene and hexene, butadiene, 1,4-pentadiene and the like so as to form copolymers of low and medium densities. The supported catalyst system is particularly useful for the polymerization of ethylene and copolymerization of ethylene with other alpha-olefins in gas phase processes.

DESCRIPTION OF THE PREFERRED EMBODIMENTS

Briefly, the catalyst components of the present invention comprises the reaction product of (a) an organometallic composition (b) at least one transition metal compound and (c) a halogen or interhalogen compound in the presence or absence of an oxide support material. According to the polymerization process of this invention, ethylene, at least one alpha-olefin having 3 or more carbon atoms or ethylene and other olefins or diolefins having terminal unsaturation is contacted with the catalyst under polymerizing conditions to form a commercially useful polymeric product.

The preferred organometallic compositions which are soluble in a suitable inert hydrocarbon solvent are represented by the formula $Me_x^{II} Me_y^{III} R_z X_{2x+3y-z}$ wherein $Me^{II}$ is at least one Group IIA or IIB metal or mixture thereof and $Me^{III}$ is a Group IIIA metal or mixtures thereof, R represents one or more hydrocarbyl or substituted hydrocarbyl group or mixtures thereof which can be the same or different, each having from 1 to about 20 carbon atoms, X is a halogen or alkoxide or mixtures thereof, the ratio of $y/x+y$ is from 0 to 1, $0<x+y$, z has a value within the range of 1 to $2x+3y$. The hydrocarbyl group represented by R may be alkyl radicals, aryl radicals, cycloalkyl radicals, aralkyl radicals, alkenyl radicals or alkadienyl radicals. Preferably the hydrocarbyl radicals are alkyl or cycloalkyl radicals. Especially preferred are alkyl radicals having from 2 to 8 carbon atoms, especially ethyl, propyl, butyl or hexyl radicals.

The metals represented by the symbol $Me^{II}$ are from Group IIA or IIB or mixtures thereof, such as, for example, Zn, Ca, Mg, and preferably magnesium. The $Me^{III}$ metal is from Group IIIA, such as boron and aluminum and preferably aluminum.

Most desirably, the organometallic compositions employed in this invention are presented by the formula $(R_2Mg)_x(R_nAlX_{3-n})_y$ wherein R and X are defined above and n is a number from 1 to 3 with the further proviso that x is greater than zero. The ratio of $y/x+y$ is from 0 to 1, preferably from 0 to about 0.7 and most desirably from about 0 to 0.1. The preferred oganometallic compositions which can be employed in accordance with this invention contain magnesium. Illustrative examples of the suitable magnesium compounds include butylethyl magnesium, di-n-butyl or diisobutyl magnesium, diamyl magnesium, di-n-hexyl magnesium, and the like, as well as dicycloalkyl magnesium compounds. The magnesium component will generally contain some alkylaluminum compound in order to reduce the viscosity of the solution. Illustrative examples of Mg.Al compositions are:

[(n-C_4H_9)(C_2H_5)Mg][(C_2H_5)_3Al]_{0.02},
[(nC_4H_9)_2Mg][(C_2H_5)_3Al]_{0.013},
[(nC_4H_9)_2Mg][(C_2H_5)_3Al]_{2.0} and
[(nC_6H_{13})_2Mg][(C_2H_5)_3Al]_{0.01}.

The hydrocarbon soluble organometallic compositions are known materials and can be prepared by conventional methods. One such method involves, for example, the addition of an appropriate aluminum alkyl to a solid dialkyl magnesium in the presence of an inert hydrocarbon solvent. The organomagnesium-organoaluminum complexes are, for example, described in U.S. Pat. No. 3,737,393, which is incorporated herein by reference. However, any other suitable method for preparation of organometallic compounds can be suitably employed.

Transition metal compounds which can be employed in accordance with this invention are represented by the formula $TrX'_{4-q}(OR')_q$, $TrX'_{4-q}R''_q$, $VOX'_3$ and $VO(OR')_3$. Tr is a Group IVB, VB, VIB, VIIB, and VIII metal, preferably Group IVB and VB metals and preferably titanium, q is 0 or a number equal to or less than 4, X' is halogen and R' is a hydrocarbyl or substituted hydrocarbyl group, for example, alkyl, aryl or cycloalkyl having from 1 to 20 carbon atoms and R'' is an aryl group, aralkyl group, substituted aralkyl group, 1,3-cyclopentadienyls and the like. The aryl, aralkyls and substituted aralkyls contain from 1 to 20 carbon atoms and preferably 1 to 10 carbon atoms. Mixtures of the transition metal compounds can be employed if desired.

Illustrative examples of the transition metal compounds include: $TiCl_4$, $TiBr_4$, $Ti(OCH_3)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$ and $Ti(OC_{12}H_{25})Cl_3$.

As indicated above, mixtures of the transition metal compounds may be usefully employed, no restriction being imposed on the number of transition metal compounds which may be reacted with the organometallic composition. Any halogenide, R'' and alkoxide transition metal compound or mixtures thereof can be usefully employed. The titanium tetrahalides are especially preferred with titanium tetrachloride being most preferred.

In the preparation of the reaction product of an organometallic composition and the transition metal compound the organometallic composition is employed in amounts such that the atomic ratio of the metals in the organometallic composition to the transition metal in the transition metal compound is in the range of about 0.2:1 to about 100:1, preferably about 0.5:1 to about 20:1.

The reaction between the organometallic composition and the transition metal compound is conducted in an inert solvent. Preferred solvents include mineral oils and the various hydrocarbons which are liquid at reaction temperatures and in which the organometallic component is soluble. Illustrative examples of useful solvents include the alkanes such as pentane, iso-pentane, hexane, heptane, octane, and nonane; cycloalkanes such as cyclopentane, cyclohexane; and aromatics such as benzene, toluene, ethylbenzene and diethylbenzene. The amount of solvent to be used is not critical. Nevertheless, the amount should be employed so as to provide adequate heat transfer away from the catalyst components during the reaction and to permit good mixing.

The organometallic composition is preferably added to the inert solvent in the form of a solution. Preferred solvents for the organometallic composition are the alkanes such as hexane, heptane, octane and the like. However, the same solvent as employed for the reaction can be employed for dissolving the organometallic composition. The concentration of the organometallic composition in the solvent is not critical and is limited only by handling needs.

The reaction between the transition metal compound and the organometallic composition in the presence or absence of the support can be conducted at temperatures in the range of from about $-50°$ to about $150°$ C. Preferred temperature range is from about $-30°$ C. to about $60°$ C. with $-10°$ C. to $50°$ C. being most preferred. The reaction time can range from about 5 minutes to about 24 hours. However, lessor or greater times can be employed. Preferably the reaction time will be from about ½ hour to about 8 hours. During the reaction constant agitation is desirable.

The order of addition of the organometallic composition and the transition metal compound to the solvent in the absence of a support material is not critical. The organometallic composition can be added first with the transition metal compound being added thereafter or the transition metal compound can be added first with the organometallic composition being added thereafter. Preferably, the organometallic composition and the transition metal compound are added simultaneously to the reaction solvent.

In one preferred aspect of this invention the reaction product of the organometallic compound and the transition metal halide compound is formed in the presence of a support material. Typically, the support can be any of the solid particulate porous supports such as talc, zirconia, thoria, magnesia, and titania. Preferably the support material is a Group IIA, IIIA, IVA and IVB metal oxide in finely divided form.

Suitable inorganic oxide materials which are desirably employed in accordance with this invention include silica, alumina and silica-alumina and mixtures thereof. Other inorganic oxides that may be employed either alone or in combination with the silica, alumina or silica-alumina are magnesia, titania, zirconia, and the like. Other suitable support materials, however, can be employed. For example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subject to a thermal treatment in order to remove water and reduce the concentration of the surface hydroxyl groups. The treatment is carried out while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed.

In order to insure that the reaction between the organometallic composition and the transition metal compound occurs within the pores of the inorganic oxide support, sequential addition of the organometallic composition and the transition metal compound is desirable. The order of sequential addition of the reactants to the reactant solvent containing the inorganic oxide support material is not critical. For example, one can make multiple additions of one or more organometallic compositions and one or more transition metal compounds in any order so long as they are added to the support sequentially and sufficient time is allowed for complete reaction to occur between additions.

When a support material is employed, the ratio of the transition metal compound with respect to the support material may vary over a wide range. However, for best results the transition metal content can be between about 0.02 to about 3 mmols of transition metal compound per gram of support material.

Treatment with the halogen or interhalogen compound of the reaction product of the organometallic composition with the transition metal compound in the absence of or with a support can be effected in the reaction solvent. Alternatively, the reaction product can be recovered and washed and dried prior to halogen and/or interhalogen compound treatment. It is generally preferred that the treatment with halogen or interhalogen compound is effected as the last step in the preparation of the catalyst component. Alternatively, with respect to the catalyst components comprising the support material, halogenation can be performed prior to the sequential addition of organometallic and transition metal compounds. Nevertheless, at whatever stage halogen should be added so as to be available after the transition metal compound-organometallic compound reaction is complete.

Washing the reaction product obtained by effecting contact of the organometallic compound with the halogen treated support material eliminates the advantages obtained in accordance with the invention by washing out available halogen or interhalogen compound. However, washing the recovered solids after completion of the contacting is desirable.

The halogen or interhalogen compound treatment can be carried out under a wide range of conditions. Good results can be obtained by treatment at ambient conditions for about 5 minutes to about 24 hours. Treatment at higher or lower temperatures and lower or higher pressures can be performed while still obtaining the excellent results in accordance with this invention.

The halogens which can be suitably employed in accordance with this invention are $Cl_2$, $Br_2$, $I_2$ and mixtures thereof. Illustrative interhalogen compounds are ClF, $ClF_3$, BrF, $BrF_3$, $BrF_5$, ICl, $ICl_3$ and IBr. The preferred halogens are $Cl_2$ and $Br_2$, the preferred interhalogens contain Br or Cl. In a preferred aspect of the invention the reaction product is reacted completely with the halogen; however, good results are obtained with less than complete reaction.

Prior to the treatment and at any stage in the preparation of the catalyst component, contacting with halogenating materials can be effected, such as, for example, other halogen-containing compounds, hydrogen halides such as HCl and HBr, Si tetrahalide and halogenated hydrocarbons such as $CCl_4$ and $C_2Cl_6$. As shown in the Examples such treatment with a halogen-containing compound such as hydrogen chloride followed by the treatment with a halogen or interhalogen compound generally obtains significantly increased activity over the idential catalyst treated solely with the halogen-containing compounds.

The catalysts prepared in accordance with this invention and described above are usefully employed with the co-catalyst known in the art of Ziegler catalysis for the polymerization of olefins. Typically, the co-catalyst are organometallic compounds of Group IA, IIA and IIIA metals such as aluminum alkyls, aluminum alkyl, hydrides, lithium aluminum alkyls, zinc alkyls, magnesium alkyls and the like. The co-catalysts desirably used are the organoaluminum compounds traditionally employed as co-catalysts. The preferred alkylaluminum compounds are represented by the formula $AlR'''_n X''_{3-n}$ wherein $R'''$ is hydrogen, hydrocarbyl or substituted hydrocarbyl group having from 1 to 20 carbon atoms, $X''$ is halogen or alkoxide and n is from 1 to 3 with at least one $R'''$ being a hydrocarbyl or substituted hydrocarbyl group. Preferably $R'''$ is an alkyl group having from 2 to 8 carbon atoms. Illustrative examples of the co-catalyst material are ethyl aluminum dichloride, ethyl aluminum sesquichloride, diethyl aluminum chloride, aluminum triethyl, aluminum tributyl diisobutyl aluminum hydride, diethyl aluminum ethoxide and the like. Aluminum trialkyl compounds are most preferred with triisobutylaluminum being highly desirable.

The catalyst system comprising the aluminum alkyl co-catalyst and the halogen treated or interhalogen compound treated organometallic composition-transition metal compound reaction product is usefully employed for the polymerization of ethylene, other alpha-olefins having from 3 to 20 carbon atoms, such as for example, propylene, butene-1, pentene-1, hexene-1, 4 methylpentene-1, and the like and ethylene copolymers with other alpha-olefins or diolefins such as 1,4-pentadiene, 1,5-hexadiene, butadiene, 2-methyl-1,3-butadiene and the like. The polymerizable monomer of preference is ethylene. The catalyst may be usefully employed to produce polyethylene or copolymers of ethylene by copolymerizing with other alpha-olefins or diolefins, particularly propylene, butene-1, pentene-1, hexene-1, and octene-1.

The polymerization reaction employing catalytic amounts of the above-described catalyst can be carried out under conditions well known in the art of Ziegler polymerization, for example, in an inert diluent at a temperature in the range of 50° C. to 100° C. and a pressure of 2 and 40 atms, in the gas phase at a temperature range of 70° C. to 100° C. at about 5 atms and upward. As indicated above, an advantageous property of the catalyst system of this invention is the reduced amount of gas phase reactor fouling.

In the processes according to this invention it has been discovered that the catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets, films and a variety of other objects.

While the invention is described in connection with the specific examples below, it is understood that these are only for illustrative purposes. Many alternatives, modifications and variations will be apparent to those skilled in the art in light of the below examples and such alternatives, modifications and variations fall within the general scope of the claims.

In Examples 1-8 the silica support was prepared by placing Davison Chemical Company G-952 silica gel in a vertical column and fluidizing with an upward flow of $N_2$. The column was heated slowly to 800° C. and held at that temperature for 12 hours after which the silica was cooled to ambient temperature. In Examples 9-14 the silica was heated to 600° C.

EXAMPLE 1

Catalyst Preparation

A 3 g portion of the dried dehydrated silica gel was weighed under ultra anhydrous conditions in a dry glass vessel equipped with a stirrer and 75 ml of a purified mineral oil was added and stirred to mix well. 6.5 ml of a solution of butylethylmagnesium (BEM) comprising 0.69 mmol BEM and 0.01 mmol triethylaluminum (TEAL) in n-heptane was added dropwise at ambient temperature to the silica slurry while stirring vigorously. After stirring for 10 minutes, the slurry was allowed to stand for 20 minutes.

A 2 ml portion of a solution of $TiCl_4$ in n-hexane containing 1.5 mmol $TiCl_4$ per ml of solution was slowly added to the slurry of silica supported BEM at ambient temperature while stirring vigorously. The particles of silica gel turned dark brown and no color was detected in the supernatant mineral oil. Titanium constituted 3.7% by weight of the total solids reaction product.

One-half of the reaction product slurry was transferred to a pressure tight glass vessel, equipped with a stirrer, which was connected to a source of dry chlorine gas. The vessel was purged with the $Cl_2$ gas to remove the $N_2$ blanket over the slurry and thereafter the vessel was pressured to 7.5 psig with $Cl_2$. The slurry was stirred vigorously for 3 hours after which the unreacted $Cl_2$ was removed by connecting the vessel to a vacuum source. The vessel was then pressured up with dry $N_2$.

Polymerization

Polymerizations using the reaction product and the halogenated reaction product were performed in a 1.5 liter stainless steel stirred reactor. 875 ml of hexane was added to the reactor and the reactor was thereafter heated to 85° C. 2.3 mmol of triisobutylaluminum (TIBAL) cocatalyst was added as a solution in n-heptane to the reactor. A weighed portion of catalyst was then added to the reactor. 45 psig of $H_2$ pressure was introduced to the reactor. Polymerization was initiated by introduction of ethylene at a pressure of 75 psi and constant total pressure was maintained by flow of ethylene into the reactor on demand. The polymerizations were terminated after one hour. The results of the polymerization are summarized in Table 1.

TABLE I

|  | Chlorinated Catalyst | Unchlorinated Catalyst |
|---|---|---|
| gms of catalyst | 0.056 | 0.192 |
| gms of resin | 195 | 192 |
| Productivity gms of resin/gm of catalyst/hour | 2,840 | 530 |
| Resin |  |  |
| Melt Index | 1.32 | 0.34 |
| Bulk Density (gms/cc) | 0.31 | 0.18 |

The results demonstrate that the catalyst of this invention has about five times the activity, a significantly improved response to $H_2$ for melt index control and produces a resin having a higher bulk density as compared with the results of the non-halogenated reaction product catalyst.

EXAMPLES 2 A, B AND C AND COMPARATIVE EXAMPLES 2A, B AND C the objective of these examples is to show that various alkyl magnesium/aluminum complexes are highly effective for the preparation of catalyst in accordance with the invention.

The solids reaction product A, B and C were prepared in the manner as described in Example 1 except the alkyl metal components were reacted with the silica gel support for one hour before adding $TiCl_4$. Solids A comprised BEM(TEAL) in a ratio of 1:0.014, solids B comprised di-n-butylmagnesium (DNBM)/TEAL in a ratio of 1:0.13 and solids C comprised DNBM/TEAL in a ratio of 1:1.75. The chlorinated catalyst A, B and C were prepared by treatment of the solids with $Cl_2$ gas in the manner as described in Example 1. Employing the amount of catalyst as summarized in Table II, polymerizations were conducted under the conditions as described in Example 1. The results are summarized in Table II. The results demonstrate that the three catalysts were substantially improved by chlorinating with $Cl_2$ gas with the lower aluminum content catalysts being the preferred compositions.

EXAMPLES 3A, B AND C AND COMPARATIVE EXAMPLES 3A, B AND C

These Examples demonstrate that various transition metal compounds can be usefully employed for the preparation of catalysts of this invention.

TABLE II

| | CATALYSTS | | | | POLYMERIZATION RESULTS | | | | |
|---|---|---|---|---|---|---|---|---|---|
| Example | Alkyl Metal Component[a] | Chlorine Treat[b] | Wt. % Ti | Grams of Catalyst | Grams of Resin | Productivity[c] | Melt Index | Polymer Bulk Density[d] |
| 2A | (BEM)(TEAL)$_{0.014}$ | Yes | 3.8 | 0.054 | 193 | 3570 | 1.33 | 0.36 |
| 2B | (DNBM)(TEAL)$_{0.13}$ | Yes | 3.7 | 0.059 | 180 | 3050 | 1.48 | 0.26 |
| 2C | (DNBM)(TEAL)$_{1.75}$ | Yes | 3.6 | 0.061 | 127 | 2080 | 0.76 | 0.21 |
| Comp. 2A | (BEM)(TEAL)$_{0.014}$ | No | 3.7 | 0.194 | 95 | 490 | 0.35 | 0.17 |
| Comp. 2B | (DNBM)(TEAL)$_{0.13}$ | No | 3.7 | 0.192 | 65 | 430 | 0.28 | 0.13 |

TABLE II-continued

| | CATALYSTS | | | POLYMERIZATION RESULTS | | | | |
|---|---|---|---|---|---|---|---|---|
| Example | Alkyl Metal Component[a] | Chlorine Treat[b] | Wt. % Ti | Grams of Catalyst | Grams of Resin | Productivity[c] | Melt Index | Polymer Bulk Density[d] |
| Comp. 2C | (DNBM)(TEAL)$_{1.75}$ | No | 3.7 | 0.197 | 62 | 315 | 0.33 | 0.15 |

[a] The gram · atom ratio of (Mg + Al) to Ti was 1.50 for all catalysts.
[b] Cl$_2$ at 7.5 psig for 3 hours while stirring the catalyst slurry vigorously.
[c] Weight of resin/weight of total catalyst/hour.
[d] gms/cc.

Three different transition metal compounds, listed in Table III were used to prepare the catalysts. Employing (BEM)(TEAL)$_{0.014}$ the solids reaction product were prepared as in Example 1. The mole ratio of BEM to transition metal component was 1.5 in each case. Portions of the supported catalyst were treated with chlorine gas for 1 hour at 7.5 psig to produce catalyst coponents in accordance with the invention. The solids A, B and C and the catalysts A, B and C prepared in accordance with the invention were evaluated by polymerization of ethylene. Employing the amount of catalyst as listed in Table III ethylene polymerizations were carried out under the conditions as in Example 1. The results of the polymerizations are summarized in Table III. Productivities were greatly increased in each case where the chlorine treatment was employed.

EXAMPLE 4

This example demonstrates the superiority of halogens over hydrogen halides for preparing the catalysts of this invention.

One portion of the solids reaction products prepared as in Example 1 was treated with HCl gas for 18 hours at 7.5 psig. Another portion of the solids reaction product was treated with Cl$_2$ gas for 1 hour at 7.5 psig to produce a catalyst component in accordance with the invention.

The solids reaction product, the HCl treated reaction product and the catalyst prepared in accordance with the invention were compared by polymerizing ethylene as described in Example 1. The results of the polymerizations are summarized in Table IV. Treatment with Cl$_2$ gas increased productivity, H$_2$ response as indicated by melt index and improved bulk density to a much greater extent than does treatment of the solids reaction product with HCl.

EXAMPLE 5

The objective of this example is to show that even after treating exhaustively a solids reaction product as prepared in Example 1 with HCl, a very large improvement in catalyst performance can be achieved by subsequent treatment with Cl$_2$ gas.

A portion of the solids reaction product prepared as in Example 1, was treated with HCl gas for 24 hours at 7.5 psig HCl to produce a HCl treated solids reaction product. This catalyst was used to polymerize ethylene under conditions as in Example 1 with the results shown in Table V as Comparative 5.

TABLE III

| | CATALYSTS | | | POLYMERIZATIONS | | | | |
|---|---|---|---|---|---|---|---|---|
| Example | Transition Metal Component | Cl$_2$ Treat | Wt. % T or V | Grams of Catalyst | Grams of Resin | Productivity[c] | Melt Index | Polymer Bulk[d] Density |
| Inv. 3A | TiCl$_4$ | Yes | 3.8 | 0.058 | 201 | 3470 | 1.76 | 0.33 |
| Inv. 3B | VCl$_4$ | Yes | 4.0 | 0.058 | 37 | 640 | 0.30 | 0.23 |
| Inv. 3C | VOCl$_3$ | Yes | 3.9 | 0.059 | 30 | 510 | 0.05 | 0.10 |
| Comp. 3A | TiCl$_4$ | No | 3.7 | 0.19 | 76 | 400 | 0.37 | 0.22 |
| Comp. 3B | VCl$_4$ | No | 3.9 | 0.19 | 10 | 53 | — | — |
| Comp. 3C | VOCl$_3$ | No | 4.0 | 0.19 | 8 | 42 | — | — |

[c] Weight of resin/weight of total catalyst/hour.
[d] grams/cc.

TABLE IV

| Halogenations | Wt. % Ti | Mol Ratio BEM/TiCl$_4$ | Grams of Catalyst | Grams of Resin | Productivity[a] | Melt Index | Polymer Bulk Density |
|---|---|---|---|---|---|---|---|
| 1 hour @ 7.5 psig Cl$_2$ | 3.8 | 1.5 | 0.059 | 151 | 2560 | 1.33 | 0.35 |
| 18 hours @ 7.5 psig HCl | 3.7 | 1.5 | 0.058 | 76 | 1310 | 0.81 | 0.23 |
| None | 3.7 | 1.5 | 0.192 | 61 | 320 | 0.35 | 0.18 |

[a] Wt. of resin/wt. of catalyst/hour.

The remaining HCl treated solids reaction product was treated with Cl$_2$ gas for 3 hours at 7.5 psig Cl$_2$ to produce a catalyst in accordance with the invention. Ethylene was polymerized under conditions as in Example 1. The results are summarized in Table V as invention Example 5.

EXAMPLE 6

The purpose of this example is to show that different orders of addition of alkylmagnesium compound and transition metal compound to the silica gel support can be employed in preparing the catalysts of this invention.

A solids reaction product was prepared using the procedure of Example 1 by treating a 3.0 g portion of silica gel with 4.5 mmol of BEM and allowing the material to react for 30 minutes at ambient temperature. 1.5 mmol of TiCl$_4$ was then added and stirring was continued for 5 minutes. This catalyst is labeled Solids A.

A second solids catalyst was prepared except 1.5 mmol of $TiCl_4$ was initially added to 3.0 gms of silica support and reacted for 30 minutes after which 4.5 mmol of BEM were added and stirred for 5 minutes. This catalyst is labeled Solids B.

Portions of Solids A and B were subsequently chlorinated using $Cl_2$ gas at 7.5 psig for 3 hours at ambient temperature and labeled Catalyst A and B respectively.

Ethylene was polymerized in the manner and under conditions as described in Example 1 using Solids A and B and Invention Catalysts A and B. The polymerization results are summarized in Table VI.

EXAMPLE 7

The objective is to show that unsupported catalysts are greatly improved by the halogen treatment in accordance with this invention.

A stirred glass vessel containing 90 ml of hexane was cooled to $-5°$ C. under a blanket of dry $N_2$. Dilute solutions containing 3 mmols of $TiCl_4$ in hexane and 3 mmols of $(BEM)(TEAL)_{0.17}$ complex were added dropwise and simultaneously to the cold hexane over a time period of 80 minutes. A dark brown catalyst precipitated as the addition proceeded. The resulting catalyst slurry was allowed to warm to room temperature and then to age for 24 hours at ambient temperature under a blanket of dry $N_2$. This unsupported comparative catalyst is identified as Solids A.

TABLE V

| CATALYSTS | | POLYMERIZATIONS | | | | |
|---|---|---|---|---|---|---|
| Example | Halogenation | Grams of Catalyst | Grams of Resin | Productivity[a] | Melt Index | Bulk Density |
| Comparative | 24 hours @ 7.5 psig HCL | 0.060 | 122 | 2030 | 0.82 | 0.25 |
| Invention 5 | 24 hours @ 7.5 psig HCL 3 hours @ 7.5 psig $Cl_2$ | 0.061 | 246 | 4030 | 1.44 | 0.32 |

[a]Weight of resin/weight of catalyst/hour.

TABLE VI

| Example | Mol Ratios BEM/$TiCl_4$ | Order of[a] Addition | Halogenation | Grams of Catalyst | Grams of Resin | Productivity | Melt Index | Bulk Density |
|---|---|---|---|---|---|---|---|---|
| Solids A | 3.0 | BEM/$TiCl_4$ | 3 hrs @ 7.5 psig $Cl_2$ | 0.055 | 164 | 2980 | 1.68 | 0.33 |
| Solids B | 3.0 | $TiCl_4$/BEM | 3 hrs @ 7.5 psig $Cl_2$ | 0.054 | 164 | 3040 | 1.27 | 0.26 |
| Solids A Treated | 3.0 | BEM/$TiCl_4$ | None | 0.185 | 7 | 38 | — | — |
| Solids B Treated | 3.0 | $TiCl_4$/BEM | None | 0.179 | 4 | 22 | — | — |

[a]BEM contains 1.4 mole % TEAL

A portion of Solids A was subsequently treated with $Cl_2$ treated catalyst of this invention were employed to polymerize ethylene in the manner of Example 1. The results of polymerization are summarized in Table VII.

Each catalyst contained approximately 18% by weight of titanium.

EXAMPLE 8

The objective of this example is to demonstrate that the halogenated catalysts of this invention are well suited for the preparation of low density polyethylene copolymers.

A reaction product was prepared exactly as in Example 1 and was treated with $Cl_2$ gas for 1 hour at atmospheric pressure. The resulting catalyst was used to copolymerize ethylene and butene-1.

The polymerization was conducted as in Example 1 except that, after addition of the triisobutylaluminum cocatalyst, 50 g of butene-1 were added to the reactor. The reactor was pressured with 45 psi $H_2$ after which 45 psi of ethylene pressure was introduced, a constant total pressure was maintained for 60 minutes and the temperature controlled to 85° C. The results are presented in Table VIII.

TABLE VIII

| | |
|---|---|
| Grams of catalyst | 0.038 |
| Grams of resin | 112 |
| Productivity (wt/wt/hr) | 2,947 |
| Resin density (gms/cc) | 0.935 |
| Melt index | 9.9 |

TABLE VII

| CATALYST COMPONENT | | POLYMERIZATIONS[a] | | | | |
|---|---|---|---|---|---|---|
| Example | Halogenation | Grams of Catalyst | Grams of Resin | Productivity | Melt Index | Bulk Density |
| Catalyst | 1 hour @ 15 psi $Cl_2$ | 0.020 | 361 | 18,050 | 2.9 | 0.31 |
| Solids A | None | 0.036 | 133 | 3,690 | 1.3 | 0.22 |

[a]Same conditions and procedure as Example 1 except pressure of $H_2$ was 50 psi.

The following example and comparative example demonstrate that $Cl_2$ can be added to the reaction vessel prior to other reactive ingredients so long as chlorine is available during the last step of catalyst preparation.

EXAMPLE 9

Catalyst Preparation

A 3.5 gram portion of dehydrated silica gel weighed under anhydrous conditions into a 125 cc. septum vial equipped with a stirring bar. 75 ml of dried degassed hexane was added via a syringe and the suspension stirred well.

The vessel was connected to a source of dry $Cl_2$ gas and purged to remove residual nitrogen. Chlorination was continued for 1 hour under a $Cl_2$ pressure of 7.5 psig. The chlorine atmosphere was then replaced by purging the vial with nitrogen for 0.5 hour. 9.2 ml of a solution of BEM comprising 0.69 mmol BEM was added dropwise at ambient temperature to the slurry while stirring vigorously. Stirring was continued for 1 hour.

A 2.1 ml portion of a solution of $TiCl_4$ in hexane containing 1.0 mmol $TiCl_4$ per ml of solution was slowly added to the slurry of silica supported BEM at ambient temperature while stirring vigorously. Stirring was continued for 1 hour. The catalyst was then filtered, washed with hexane and dried in vacuo.

Polymerization

Employing the amounts of catalyst as summarized in Table IX, polymerizations were conducted under conditions as in Example 1. The results as summarized in Table IX demonstrate that the addition of chlorine into the catalyst preparation vessel prior to the addition of BEM and $TiCl_4$ results in the production of an highly active polymerization catalyst.

EXAMPLE 9—COMPARATIVE

Catalyst Preparation

A 3.5 gram portion of dehydrated silica gel was weighed under anhydrous conditions into a 125 cc. septum vial equipped with a stirring bar. 75 ml of dried degassed hexane was added via a syringe and the suspensions stirred well. The vessel was connected to a source of dry $Cl_2$ gas and purged to remove residual nitrogen. Chlorination was continued for 1 hour under a $Cl_2$ pressure of 7.5 psig. The chlorine atmosphere was then replaced by purging the vial with nitrogen for 0.5 hour. The chlorine treated silica was filtered, washed with hexane and dried in vacuo. 3.2 grams of the treated silica was recovered.

To the treated silica [above] was added 75 cc of dried degassed hexane and the resulting slurry stirred vigorously. 8.3 ml of a solution of BEM comprising 0.69 mmol BEM was added dropwise at ambient temperature to the slurry while stirring vigorously. Stirring was continued for 1 hour.

A 1.9 ml portion of a solution of $TiCl_4$ in hexane containing 1.0 mmol $TiCl_4$ per ml of solution was slowly added to the slurry of silica supported BEM at ambient temperature while stirring vigorously. Stirring was continued for 1 hour. The catalyst was then filtered, washed with hexane and dried in vacuo.

Polymerization

Ethylene was polymerized under identical condition as in Example 9. The results as summarized in Table IX show that by washing the chlorinated silica (thereby removing available chlorine) prior to the addition of BEM and $TiCl_4$ poor results are obtained.

EXAMPLE 10

Catalyst Preparation

A 3.5 gram portion of dehydrated silica gel was weighed under anhydrous conditions into a 125 cc septum vial equipped with a stirring bar. 75 ml of dried degassed hexane was added via a syringe and the suspension stirred well. 9.2 ml of a solution of BEM comprising 0.69 mmol BEM was added dropwise at ambient temperature to the slurry while stirring vigorously. Stirring was continued for 1 hour.

The vessel was connected to a source of dry $Cl_2$ gas and purged to remove residual nitrogen. Chlorination was continued for 1 hour under a $Cl_2$ pressure of 7.5 psig. The chlorine atmosphere was then replaced by purging the vial with nitrogen for 0.5 hour.

A 2.1 ml portion of a solution of $TiCl_4$ in hexane containing 1.0 mmol $TiCl_4$ per ml of solution was slowly added to the slurry of silica supported BEM at ambient temperature while stirring vigorously. Stirring was continued for 1 hour. The catalyst was then filtered, washed with hexane and dried in vacuo.

Polymerization

Ethylene was polymerized under identical conditions as in Example 9. The conditions and results are summarized in Table IX.

EXAMPLE 11

The following examples demonstrate that halogens are unexpectedly superior to halide containing compound with respect to improving the activity and productivity of ethylene polymerization catalyst.

EXAMPLE 11—COMPARATIVE

Catalyst Preparation

A 3.5 gram portion of dehydrated silica gel was weighed under anhydrous conditions into a 125 cc septum vial equipped with a stirring bar. 75 ml of dried degassed hexane was added via a syringe and the suspension stirred well.

9.2 ml of a solution of BEM comprising 0.69 mmol BEM was added dropwise at ambient temperature to the slurry while stirring vigorously. Stirring was continued for 1 hour.

A 2.1 ml portion of a solution of $TiCl_4$ in hexane containing 1.0 mmol $TiCl_4$ per ml of solution was slowly added to the slurry of silica supported BEM at ambient temperature while stirring vigorously. Stirring was continued for 1 hour.

A 10 ml portion of neat $SiCl_4$ containing 0.87 mmol $SiCl_4$ per ml was added to the stirring catalyst slurry. This slurry was stirred for an additional hour at ambient temperature. The final catalyst was then filtered, washed with hexane and dried in vacuo.

Polymerization

Ethylene was polymerized under identical conditions as Example 9. The conditions and results are summerized in Table IX.

EXAMPLE 12

Catalyst Preparation

A 3.5 gram portion of dehydrated silica gel was weighed under anhydrous conditions into a 125 cc septum vial equipped with a stirring bar. 75 ml of dried degassed hexane was added via a syringe and the suspension stirred well.

9.2 ml of a solution of BEM comprising 0.69 mmol BEM was added dropwise at ambient temperature to the slurry while stirring vigorously. Stirring was continued for 1 hour.

A 2.1 ml portion of a solution of $TiCl_4$ in hexane containing 1.0 mmol $TiCl_4$ per ml of solution was slowly added to the slurry of silica supported BEM at ambient temperature while stirring vigorously. Stirring was continued for 1 hour.

A 10 ml portion of neat $SiCl_4$ containing 0.87 mmol $SiCl_4$ per ml was added to the stirring catalyst slurry. This slurry was stirred for an additional hour at ambient temperature.

The vessel was connected to a source of dry $Cl_2$ gas and purged to remove residual nitrogen. Chlorination was continued for 1 hour under a $Cl_2$ pressure of 7.5 psig. The chlorine atmosphere was then replaced by purging the vial with nitrogen for 0.5 hour. The final catalyst was then filtered, washed with hexane and dried in vacuo.

Polymerization

Ethylene was polymerized under identical conditions as Example 11. The conditions and results are summarized in Table IX. The results demonstratively show that the activity and productivity of a $SiCl_4$ treated catalyst is unexpectedly improved by further treatment with a halogen.

EXAMPLE 13—Comparative

Catalyst Preparation

A 3.5 gram portion of dehydrated silica gel was weighted under anhydrous conditions into a 125 cc septum vial equipped with a stirring bar. 75 ml of dried degassed hexane was added via a syringe and the suspension stirred well.

9.2 ml of a solution of BEM comprising 0.69 mmol BEM was added dropwise at ambient temperature to the slurry while stirring vigorously. Stirring was continued for 1 hour.

A solution containing a one to one molar ratio of $TiCl_4$ and $CCl_4$ was prepared and stirred for 0.5 hour at ambient temperature. A 2.1 ml portion of this solution containing 1.0 mmol $TiCl_4$ per ml of solution was slowly added to the slurry of silica supported BEM at ambient temperature while stirring vigorously. Stirring was continued for 1 hour. The catalyst was filtered, washed with hexane and dried in vacuo.

Polymerization

Ethylene was polymerized under identical conditions as Example 11. The conditions and results are summarized in Table IX.

EXAMPLE 14

A 3.5 gram portion of dehydrated silica gel dried at 600° C. under $N_2$ was weighed under anhydrous conditions into a 125 cc. septum vial equipped with a stirring bar. 75 ml of dried degassed hexane was added via a syringe and the suspension stirred well.

9.2 ml of a solution of BEM comprising 0.69 mmol BEM was added dropwise at ambient temperature to the slurry while stirring vigorously. Stirring was continued for 1 hour.

A 2.1 ml portion of a solution of $TiCl_4$ in hexane containing 1.0 mmol $TiCl_4$ per ml of solution was slowly added to the slurry of silica supported BEM at ambient temperature while stirring vigorously. Stirring was continued for 1 hour.

The vessel was connected to a source of dry $Cl_2$ gas and purged to remove residual nitrogen. Chlorination was continued for 1 hour under a $Cl_2$ pressure of 7.5 psig. The chlorine atmosphere was then replaced by purging the vial with nitrogen for 0.5 hour. The final catalyst was filtered, washed with hexane and dried in vacuo. The final catalyst contained 2.2% titanium.

Polymerization

Ethylene was polymerized under identical conditions as in Example 9. The conditions and results are summarized in Table IX.

EXAMPLE 15

Catalyst Preparation

A 3.5 gram portion of silica gel dried at 600° C. under $N_2$ was weighed under anhydrous conditions into a 125 cc. septum vial equipped with a stirring bar. 75 ml of dried degassed hexane was added via a syringe and the suspension stirred well.

The vessel was connected to a source of dry $Cl_2$ gas and purged to remove residual nitrogen. Chlorination was continued for 1 hour under a $Cl_2$ pressure of 7.5 psig. The chlorine atmosphere was then replaced by purging the vial with nitrogen for 0.5 hour. 9.2 ml of a solution of butylethylmagnesium (BEM) comprising 0.69 mmol BEM was added dropwise at ambient temperature to the slurry while stirring vigorously. After stirring for 1 hour, the catalyst was filtered, washed with hexane and dried in vacuo.

Approximately half of the above dry solid (1.85 grams) was reslurried in 35 cc of hexane. The remaining solid was used in the example below. The stirred slurry was then treated with 1.0 cc of a 1 mmole $TiCl_4$/cc of hexane solution. Stirring was continued for 1 hour. The catalyst was then filtered, washed with hexane and dried in vacuo.

Polymerization

Ethylene was polymerized under identical conditions as in Example 9. The condition and results are summarized in Table IX.

EXAMPLE 16

Catalyst Preparation

The remaining portion of the dry solid obtained in the preparation for Example 15 above was reslurried in 35 cc of hexane in a 125 cc vial. The vessel was connected to a source of dry $Cl_2$ gas and purged to remove residual nitrogen. Chlorination was continued for 1 hour under a $Cl_2$ pressure of 7.5 psig. The chlorine atmosphere was then replaced by purging the vial with nitrogen for 0.5 hour.

A 1.0 ml portion of a solution of $TiCl_4$ in hexane containing 1.0 mmol $TiCl_4$ per ml of solution was slowly added to the slurry at ambient temperature while stirring vigorously. Stirring was continued for 1 hour after which time the catalyst was filtered, washed with hexane and dried in vacuo.

Polymerization was produced at the rate of 150 lbs/hr. The polymer had a melt index of 1.49 dg/min.

TABLE IX

| | Catalyst Preparation Data | Polymerization Data[1] | |
|---|---|---|---|
| Example No. | Order of Addition[2] | Specific Activity (kg-PE/g-Ti-hr-atm) | Productivity (grPE/gr catalyst/hr) |
| 9 | $SiO_2/Cl_2/BEM/TiCl_4$ | 28.7 | 3220 |
| 9-Comparative | $SiO_2/Cl_2/WASH,DRY/BEM/TiCl_4$ | 2.4 | 269 |
| 10 | $SiO_2/BEM/Cl_2/TiCl_4$ | 14.3 | 1604 |
| 11 | $SiO_2/BEM/TiCl_4/SiCl_4$ | 5.3 | 595 |
| 12 | $SiO_2/BEM/TiCl_4/SiCl_4/Cl_2$ | 24.1 | 2704 |
| 13 | $SiO_2/BEM/TiCl_4/CCl_4$ | 16.1 | 1806 |
| 14 | $SiO_2/BEM/TiCl_4/Cl_2$ | 22–24 | 2700 |
| 15 | $SiO_2/Cl_2/BEM/WASH,DRY/TiCl_4$ | 0 | 0 |
| 16 | $SiO_2/Cl_2/BEM/WASH,DRY/Cl_2.TiCl_4$ | 2.7 | 450 |

[1] Polymerization performed under the following conditions:
45 psig $H_2$, 75 psig $C_2H_4$   cocatalyst — trisobutyl aluminum
1400 cc Hexane
Al/Ti Ratio = 60, 40 min polymerization
Catalyst charge — 0.075 g containing 2.2% titanium
[2] Molar Ratio of Mg to Ti = 3

Ethylene was polymerized under identical conditions as in Example 9. The conditions and results are summarized in Table IX.

EXAMPLE 17

A 1000 gram portion of Davison 952 silica was dehydrated at 600° C. This silica was added to a 10-liter catalyst preparation vessel equipped with a mechanical agitator. 2000 cc of isopentane was then added and the agitation started. 2817 cc of a solution of 10% (wt) BEM in heptane was then added while maintaining the mixture at 45° C. After the addition was complete an additional 1000 cc of isopentane was added and the mixture agitated for 4 hours. At this point, 37.9 gms of TiCl₄ was added and the mixture reacted for one hour at 45° C. Following this period, the nitrogen atmosphere in the vessel was replaced by Cl₂ gas. The Cl₂ pressure was maintained at 7.5 psig for 1.5 hours at 45° C. after which the Cl₂ was displaced by N₂. The final catalyst was recovered by heating the vessel to a jacket temperature of 75° C. while decreasing the N₂ pressure to 2 psig and venting the volatilized isopentane solvent. The dry catalyst was recovered under an N₂ atmosphere.

A 36 inch internal diameter fluidized bed reactor vessel, operated in a continuous manner, was used to produce an ethylene, butene-1 copolymer. A reaction mixture comprising ethylene, butene-1 and hydrogen was circulated continuously through the bed at a superficial velocity estimated to be about three to four times the minumum necessary for fluidization. In the fluidized bed, the reaction temperature was controlled at 75° C. by adjusting the temperature of the gas fed to the fluidized bed reactor vessel using a heat exchanger in the circulating gas loop. Aluminum triethyl was pumped continuously into the reactor as a 11% (wt) solution in isopentane. The solid catalyst described above was blown into the reactor as a dry powder in a stream of nitrogen so as to maintain a rate of polymer production of about 150 lb/hr, which corresponds to a mean residence time of four hours. The reaction pressure was maintained automatically by admitting an ethylene/hydrogen mixture through a control valve. Liquid butene-1 was pumped into the circulating gas stream so as to maintain a constant composition as determined by Gas-Liquid Chromotography. The polymer formed was removed periodically so as to maintain an essentially constant level in the reactor vessel. The polymer collected was degassed in a stream of nitrogen. Polymer

What is claimed is:
1. A catalyst component for the polymerization of alpha-olefins comprising the solid reaction product obtained by contacting in an inert solvent an inert solid porous particulate support material, (A) at least one organometallic compound of a Group IIA, IIB and IIIA metal, (B) at least one transition metal compound of a Group IVB, VB, VIB, VIIB and VIII metal, and at any stage of the contacting, (C) a sufficient amount of a halogen or interhalogen compound such that after said solid oxide is contacted with said organometallic compound and said transition metal compound halogen or interhalogen compound is available.

2. The catalyst component of claim 1 wherein the inert solid particulate porous support material is a solid oxide support of a Group IIA, IIIA, IVA and IVB metal or a finely divided polyolefin and is contacted in separate stages with (A) the organometallic compound represented by the formula:

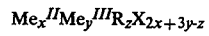

$$Me_x^{II}Me_y^{III}R_zX_{2x+3y-z}$$

wherein $Me^{II}$ is Group IIA or IIB metal or mixture thereof and $Me^{III}$ is a Group IIIA metal or mixtures thereof, R is a hydrocarbyl group having from 1 to about 20 carbon atoms, X is a halogen or alkoxide or mixtures thereof, the ratio of $y/x+y$ is from 0 to 1, z has a value within the range of 1 to $2x+3y$, (B) the transition metal compound or mixtures thereof represented by the formula $TrX'_{4-q}(OR')_q$, $TrX'_{4-q}R''_q$, $VOX'_3$ or $VO(OR')_3$ wherein Tr is a transition metal, R' is a hydrocarbyl group having from 1 to 20 carbon atoms, R" is an aryl group or aralkyl group, having from 1 to 20 carbon atoms and 1,3-cyclopentadienyls, X' is halogen and q is 0 or a number equal to or less than 4, and (C) the halogen or interhalogen is chlorine or bromine.

3. The catalyst component of claim 2 wherein the organometallic composition is represented by the formula $(R_2Mg)_x(R_nAlX_{3-n})_y$ wherein n is a number from 1 to 3 and x is greater than zero and the transition metal compound is $TiCl_4$.

4. The catalyst component of claim 1 wherein the contacting with the inert solid particulate porous support material is in the sequential order of, (1) organometallic compound, (2) transition metal compound and (3) halogen or interhalogen compound.

5. The catalyst component of claim 1 wherein the contacting with the inert solid particulate porous support material is in the sequential order of (1) halogen or interhalogen compound, (2) organometallic compound (3) transition metal compound.

6. The catalyst component of claim 1 wherein the halogen compound is contacted continuously.

7. The catalyst component of claim 2 wherein the halogen or inherhalogen compound is contacted with a product recovered from the contacting of the organometallic compound and transition metal compound with the solid oxide support.

8. The catalyst component of claim 7 wherein the solid oxide support is selected from the group consisting of silica, alumina and silica-alumina.

9. A catalyst component for the homo or co-polymerization of ethylene comprising the solid reaction product obtained by contacting in an inert solvent (a) silica (b) $[(n-C_4H_9)(C_2H_5)Mg][(C_2H_5)_3Al]_y$ wherein y is zero or a number of from about 0.01 to about 2, (c) $TiCl_4$ and (d) $Cl_2$.

10. The catalyst component of claim 9 wherein the reactants are contacted in the sequential order of (a), (b), (c) and (d).

11. A catalyst component for the polymerization of alpha-olefins comprising the solid reaction product obtained by contacting in an inert solvent an organometallic compound of a Group IIA, IIB or an organometallic complex compound of a IIA/IIIA metal, a transition metal compound of a Group IVB, VB, VIB, VIIB and VIII metal and a halogen or interhalogen compound.

12. A catalyst system for the polymerization of alpha-olefins comprising the catalyst component of claim 1 and an organoaluminum compound of the formula $AlR''_nX''_{3-n}$ wherein R'' is hydrogen, hydrocarbyl or substituted hydrocarbyl group having 1 to 20 carbon atoms, X is a halogen and n is a number from 1 to 3.

13. A catalyst system for the polymerization of alpha-olefins comprising the catalyst component of claim 2 and an organoaluminum compound of the formula $AlR''_nX''_{3-n}$ wherein R'' is hydrogen, hydrocarbyl or substituted hydrocarbyl group having 1 to 20 carbon atoms, x is a halogen and n is a number from 1 to 3.

14. A catalyst system for the polymerization of alpha-olefins comprising the catalyst component of claim 3 and an organoaluminum compound of the formula $AlR''_nX''_{3-n}$ wherein R'' is hydrogen, hydrocarbyl or substituted hydrocarbyl group having 1 to 20 carbon atoms, x is a halogen and n is a number from 1 to 3.

15. A catalyst system for the polymerization of alpha-olefins comprising the catalyst component of claim 4 and an organoaluminum compound of the formula $AlR''_nX''_{3-n}$ wherein R'' is hydrogen, hydrocarbyl or substituted hydrocarbyl group having 1 to 20 carbon atoms, x is a halogen and n is a number from 1 to 3.

16. A catalyst system for the polymerization of alpha-olefins comprising the catalyst component of claim 5 and an organoaluminum compound of the formula $AlR''_nX''_{3-n}$ wherein R'' is hydrogen, hydrocarbyl or substituted hydrocarbyl group having 1 to 20 carbon atoms, x is a halogen and n is a number from 1 to 3.

17. A catalyst system for the polymerization of alpha-olefins comprising the catalyst component of claim 6 and an organoaluminum compound of the formula $AlR''_nX''_{3-n}$ wherein R'' is hydrogen, hydrocarbyl or substituted hydrocarbyl group having 1 to 20 carbon atoms, x is a halogen and n is a number from 1 to 3.

18. A catalyst system for the polymerization of alpha-olefins comprising the catalyst component of claim 7 and an organoaluminum compound of the formula $AlR''_nX''_{3-n}$ wherein R'' is hydrogen, hydrocarbyl or substituted hydrocarbyl group having 1 to 20 carbon atoms, x is a halogen and n is a number from 1 to 3.

19. A catalyst system for the polymerization of alpha-olefins comprising the catalyst component of claim 8 and an organoaluminum compound of the formula $AlR''_nX''_{3-n}$ wherein R'' is hydrogen, hydrocarbyl or substituted hydrocarbyl group having 1 to 20 carbon atoms, x is a halogen and n is a number from 1 to 3.

20. The catalyst of claim 2 wherein the solid oxide support is silica or alumina.

21. The catalyst of claim 2 wherein $y/x+y$ is from 0 to about 0.7.

22. The catalyst of claim 21 wherein $y/x+y$ is from 0 to about 0.1.

* * * * *